DECODING MECHANISM FOR MULTIPLE CODES

Filed Sept. 4, 1957 4 Sheets-Sheet 1

INVENTORS
ELLSWORTH L. REITSMA
COSTAS AVGERINOS
BY John J. Lynch
ATTORNEY

July 26, 1960 E. L. REITSMA ET AL 2,946,850

DECODING MECHANISM FOR MULTIPLE CODES

Filed Sept. 4, 1957 4 Sheets-Sheet 2

INVENTORS
ELLSWORTH L. REITSMA
COSTAS AVGERINOS
BY John J. Tyrach
ATTORNEY

July 26, 1960 E. L. REITSMA ET AL 2,946,850
DECODING MECHANISM FOR MULTIPLE CODES
Filed Sept. 4, 1957 4 Sheets-Sheet 3
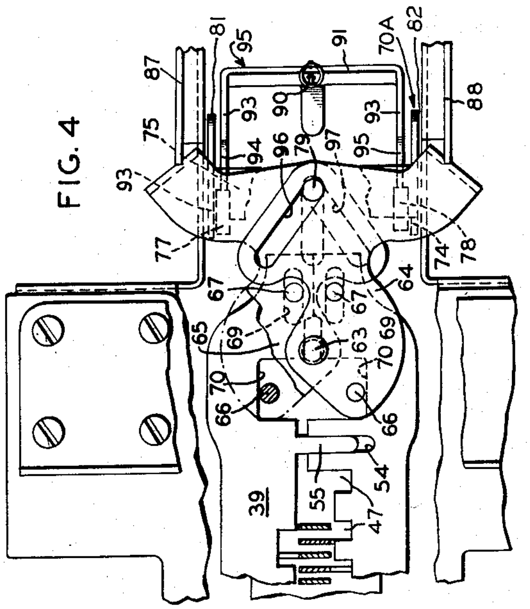
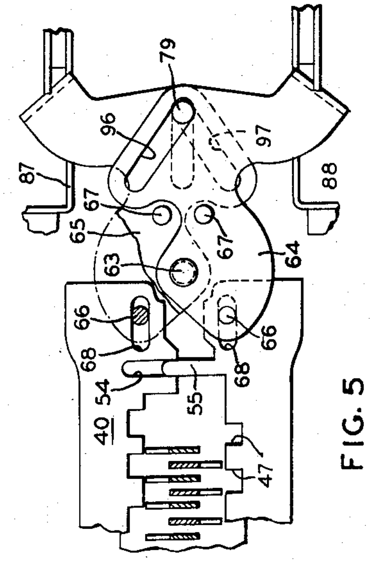
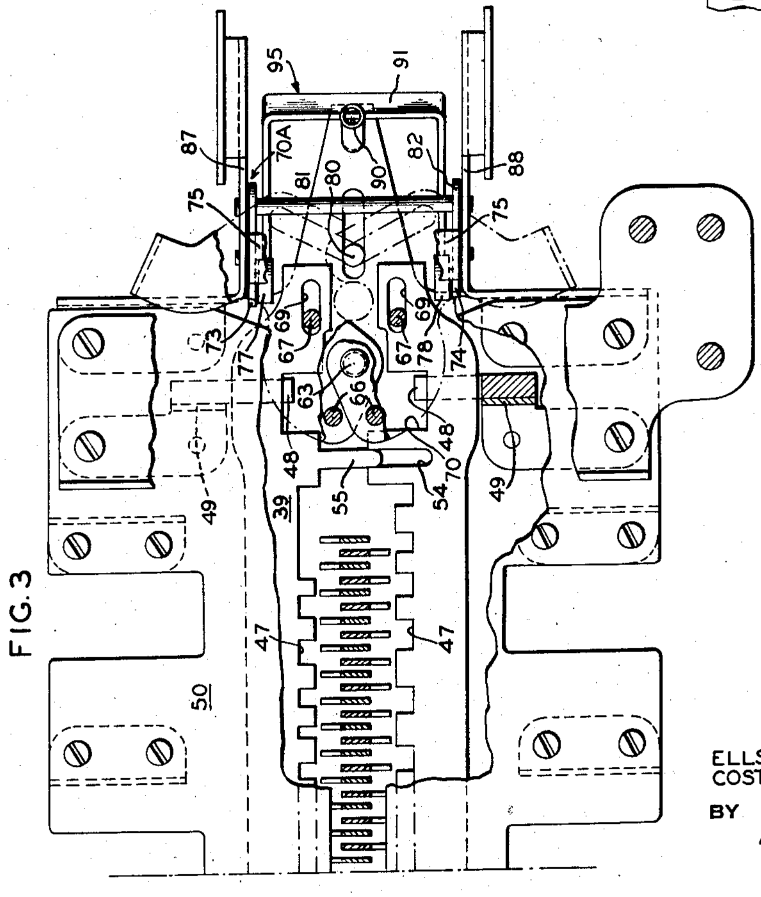
INVENTORS
ELLSWORTH L. REITSMA
COSTAS AVGERINOS
BY John J. Lynch
ATTORNEY

DECODING MECHANISM FOR MULTIPLE CODES

Filed Sept. 4, 1957

4 Sheets-Sheet 4

INVENTORS
ELLSWORTH L. REITSMA
COSTAS AVGERINOS
BY John J. Lynch
ATTORNEY

United States Patent Office 2,946,850

Patented July 26, 1960

2,946,850

DECODING MECHANISM FOR MULTIPLE CODES

Ellsworth L. Reitsma, Norwalk, and Costas Avgerinos, Wilton, Conn., assignors to Sperry Rand Corporation, New York, N.Y., a corporation of Delaware Filed Sept. 4, 1957, Ser. No. 681,942

17 Claims. (Cl. 178—33)

This invention relates to new and useful improvements in machines which receive coded information on tape or cards and decode the same for printing on a sheet.

The invention may be used in association with an accounting machine of the general type set forth in U.S. Patent No. 2,364,758 issued December 12, 1944, to E. O. Roggenstein and entitled, "Recording and Computing Machine." It may also be associated with the machine set forth in application Serial No. 681,950, filed September 4, 1957, and entitled, "Machine for Recording and Verifying Magnetic Tape Data" in which there is shown a decoding and an encoding mechanism. In the application above mentioned, it is only possible to operate with respect to data received into the machine in one form of code such as a five position code or eight position code.

It is the object of the present invention to provide a decoding device which is adapted to receive and decode material encoded in tape or cards in more than one form of code, as well as to receive and decode material "on line" from computers, to bookkeeping or like business machines.

In the machine set forth in the above mentioned application, the decoding device was adapted to handle data disposed on tape or cards in only one form of code such as the binary code as used in high speed computers such as the Univac. However in this machine the set of decoding slides could not be adapted to decode data which was recorded on tapes or cards in any other code.

In accordance with the present invention the decoding mechanism used is provided with more than one set of decoding slides and with an automatic or operator-manipulated means whereby one or another set of slides is disposed in operative position for decoding data formed in accordance with one code while the other sets of slides, adapted to decode data formed in accordance with other codes are held in inoperative position. By this means either of the machines above mentioned, with which this improved decoding device may be associated, will have their commercial facility enhanced.

A present preferred form of the invention is illustrated in the drawings, of which, Fig. 1 is a vertical front-to-rear section taken through the key section of an accounting machine employing decoding mechanism of my invention;

Figs. 2 and 3, placed end to end provide an enlarged top view in section, with parts broken away, and taken on the line 2—2 of Fig. 1, and showing one set of slides at inoperative position;

Fig. 4 is a view of the right hand end of the decoding mechanism shown in Fig. 3, with the same set of slides shown in operative position;

Fig. 5 is a view similar to Fig. 4 showing another set of slides at inoperative position;

Figure 1:
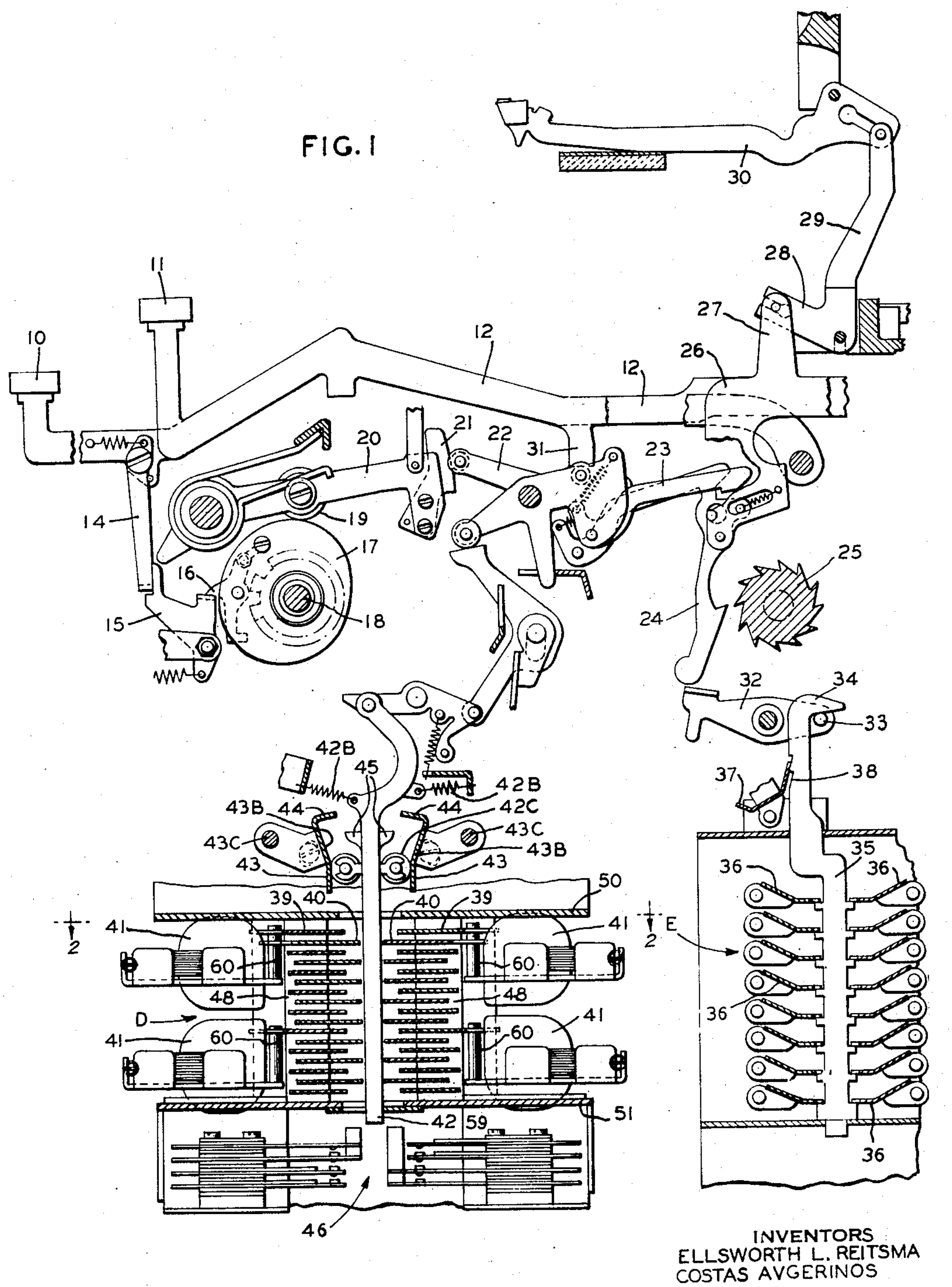

The form of the invention shown herein is represented as associated with an accounting machine of the general type above mentioned and this accounting machine generally speaking, includes the numeral keys 10 and alphabetical keys 11 mounted on rock levers 12 pivoted at their rear ends in the usual manner. Depression of a numeral key 10 lowers a pusher link 14 to move a latch 15 away from a dog 16 which will engage a power cam 17 with a continuously driven shaft 18. A roller 19 rests on the cam 17 and is disposed on a lever 20 which has at its outer end a pivoted pawl 21 which, on the upstroke of the lever 20 will engage an arm of a bell crank lever 22 and, in the manner set forth in more detail in the above mentioned patent, operates a pawl finger 23 to swing a snatch pawl 24 into engagement with a continuously rotating snatch roll 25.

The snatch pawl 24 is connected to a sublever 26 having an upstanding arm 27 pivoted to an arm 28 on the bell crank 29 connected to the type bar 30. The levers 12 of the alphabetical keys 11 have dependent lugs 31 connected to the linkage which operates the pawl 23 so that in this form of the mechanism, the snatch pawl 24 effects the operation of both alphabet and numeral type bars. This description is merely to indicate the manner in which the type bars are operated and is set forth more in detail in the patent above mentioned which represents a general type of accounting machine in which the invention may be employed. The invention may also be used with a typewriter as employed in the application above referred to.

In the form of the invention shown generally in Fig. 1 there is a decoding unit generally designated by the letter D and an encoding unit generally designated by the letter E.

The encoding device, which is not part of the invention herein, may be generally described as follows:

Whenever a key 10 or 11 is depressed it will operate its proper type bar 30 at which time the snatch pawl 24 is moved downwardly as previously described. As this happens the lower end of the snatch pawl engages one end of a lever 32 the other end of which is provided with a stud 33 over which lies the bent end 34 of a selector rod or bar 35 which is related to that particular key depressed. This bar 35 cooperates with a plurality of selector code slide plates 36 which are pivotally mounted and suitably notched in accordance with a particular code so that when any particular bar is lifted, in response to the depression of its related key, and the predetermined plates 36 are pivoted, they close a circuit to pulse the same for any desired purpose such as the punching of a tape or the recording thereon of magnetic pulses in code or for feeding pulses directly to a computer. When the bar 36 is lifted it is held thus by engagement of a latch bar 37 engaging in notches 38 in the side of the bar. A subsequent pulse may be transmitted to unlatch the member 37. The details of the structure and operation of the encoding mechanism shown is set forth in the above mentioned application and need not be further explained herein.

It is the improvement made in the decoding mechanism D and the adaptation of the latter to the typing mechanisms of machines referred to herein, and particularly as it pertains to applications requiring two or more code systems, and/or the improvement of existing code systems such as those having a limited number of code positions, which constitutes the present invention and which will be set forth in detail, hereinafter. In the form of the decoding unit D herein shown, there are two sets or groups of decoding slides indicated by the numerals 39 and 40. In the form shown in the above mentioned application there is only one set of slides and these are longitudinally positioned by energization of predetermined magnets 41. These slides are arranged in pairs on opposite sides of a series of vertically extending upper and lower case decoding arms or selector bars 42 having cam rollers 42C. The magnets 41 are pulsed by a card or tape reading circuit means, described in said application, to set the slides and when they are set, a pair of pivoted flipper bails 43 having cam portions 43B are rocked downwardly. The upper horizontal lips or bent ends 44 of these bails will encounter oppositely extending shoulders 45 on the upper ends of the alternate bars 42 and pull one of a pair of bars down depending upon which side of the bar the shoulder is disposed.

It is to be noted that there are as many bars 42 as there are characters to be decoded and printed, whether the decoding mechanism is to be used with the accounting machine or some other machine plus other bars to effect other mon-printing functions. Therefore, when the bars 42 tilt under pressure applied by their respective springs 42B and as allowed by the travel of the rollers 42C over the cam surfaces 43B the arm 42 which finds alined notches on the code slide plates will be able to swing and thus have its shoulder caught beneath the bent upper end of the flipper bails 43. It is therefore evident that only one bar will be swung to one side and that one will be the bar for which the code slide plates have been set by the pulses imposed on the magnets 41. Those that cannot be tilted will be thus so positioned that their shoulders 45 will not be engaged by the descending flipper bails.

Figure 8:
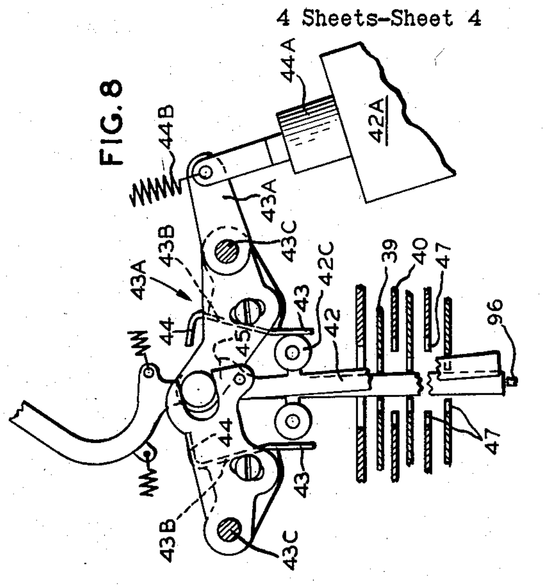
Fig. 8 is a detail of the mechanism for operating the flipper bails.
Figure 7:
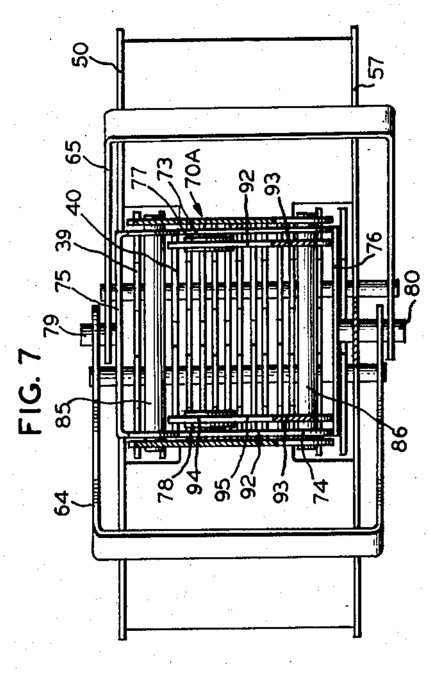
Fig. 7 is a transverse section taken on the line 7—7 of Fig. 6.

As shown in Fig. 8, the flipper bails 43 may be swung about their pivots 43C through suitable coacting linkage means 43A which is operated by connection to an actuator or core 44A of an electromagnet or solenoid 42A. By this action the decoding selector arms or bars 42 are moved down by a spring 44B when the magnet deenergizes and are moved up to inoperative position against the resistance of the spring and are so held when the magnet 42A is energized. This construction is set forth in the above mentioned application. When certain other selector bars 42 are moved down and swung one way or another the lower ends thereof may be utilized to operate certain switches such as indicated generally by the numeral 46, to perform any non-typing actions of the mechanism such as carriage shift, tabulation, spacing, etc. These switches 46 may also be used for timing purposes. The operation of the decoding device per se thus described with only one set of code plates is set forth in the above mentioned application.

Figure 2:
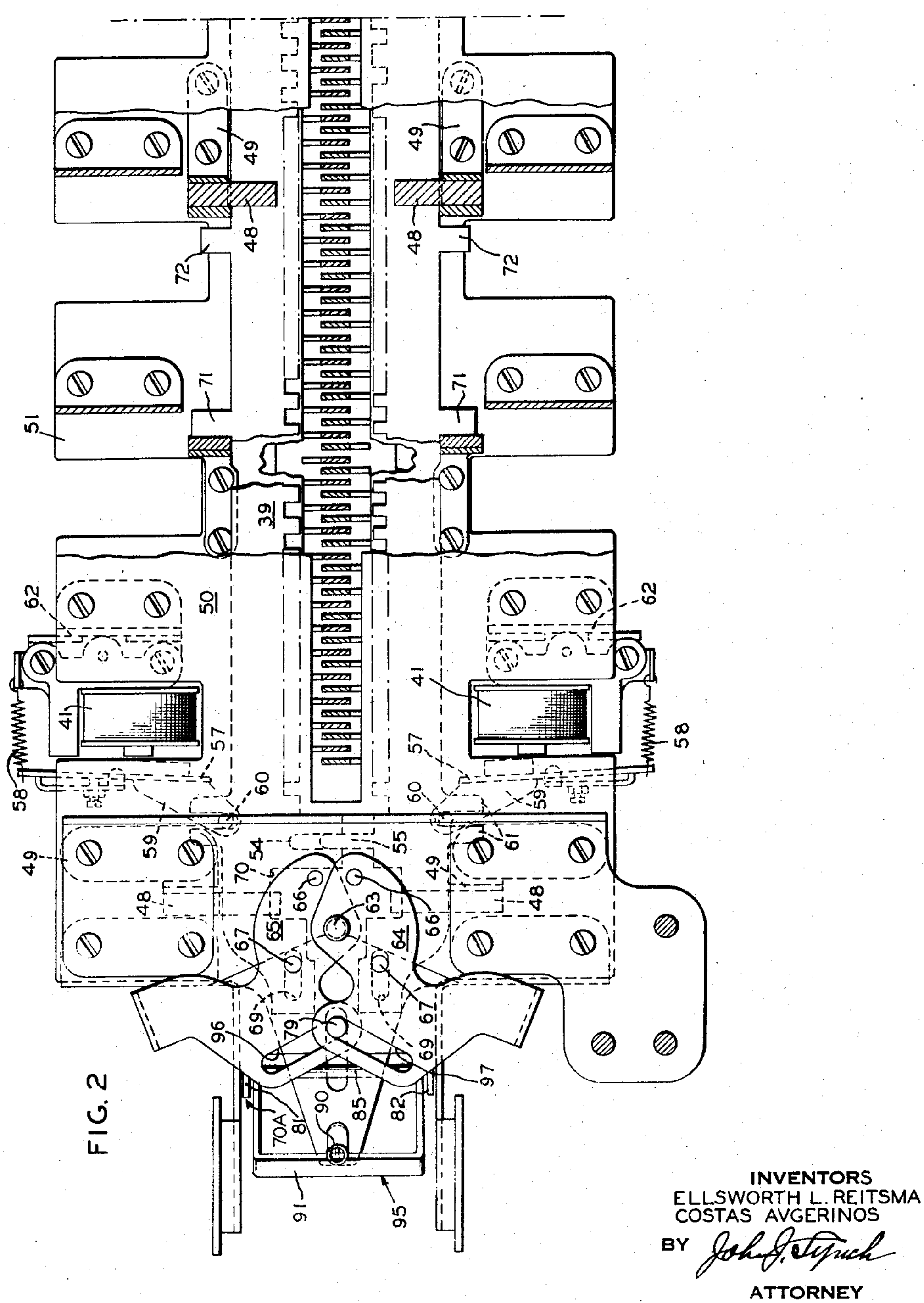
Figure 6:
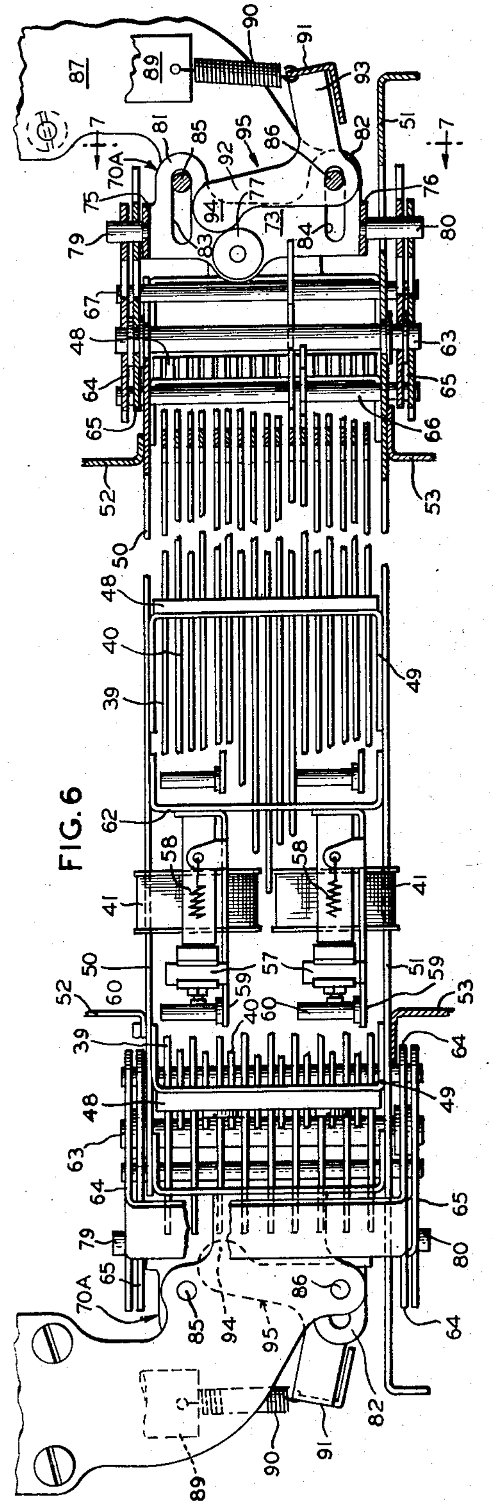
Fig. 6 is a view in front elevation, with parts shown in section, of the decoding mechanism looking from the left in Fig. 1.

The modification of the decoding device which constitutes the present invention, comprises a plurality of sets or groups of superposed pairs of slide code plates 39 and 40. Each of these plates is provided on one edge with code notches 47 (Fig. 3), and the respective pairs of plates are disposed in the same plane with the notched edges facing each other. There are nine pairs of plates 39 and eight pairs of plates 40 as shown in Fig. 1. The pairs of plates 39 are notched in accordance with one code and the pairs of plates 40 are notched in accordance with another code. Whereas the eight pairs of plates 40 in this instance correspond to the number of code positions of one of the code systems used, the nine pairs of plates 39 correspond to the number of code positions of the other system plus four. One of the applications for the extra four pairs of plates is to increase the number of code combinations available in a code system which has a limited number of code positions. All these plates 39 and 40 are supported for horizontal endwise sliding movement in slotted comb plates 48 as shown in Figures 2, 3, and 6. These comb plates are supported on bracket strips 49 connected at their tops and bottoms to upper and lower frame plates 50 and 51 respectively (Fig. 6). These upper and lower frame plates are connected to and are supported by brackets 52 and 53 respectively connected to the main frame of the machine in any suitable manner.

As will be described later in detail the respective pairs of decoding slides or plates 39 and 40 are adapted to be moved into operative and inoperative position, so that at one time one set or group of plates may be used to decode information according to one code while at another time the other set of plates may be used to decode information according to another code. It is to be noted that at all times the plates of each pair are in engagement with each other whether they are moved to operative or inoperative position. To achieve this each plate of each pair of plates is provided with an elongated notch 54 near one end and an elongated projecting finger 55 near its other end (Figs. 2 and 3). The plates are so disposed that the finger 55 of one plate will engage in the notch 54 of the other plate of the pair of plates. In Fig. 3 it is shown that the pair of plates are moved apart to their inoperative position but the finger 55 and the notch 54 are still in engagement. In Fig. 4 the same pair of plates have been moved to operative position closer together and in this position the finger 55 extends further into the notch 54. Therefore the two plates of each pair of plates are always connected by this finger and notch construction.

Because each pair of plates are thus always in engagement, they may be moved together horizontally to be set for code purposes by only one magnet. Since there are seventeen pairs of slide code plates there must be seventeen magnets such as 41. Each magnet has an armature 57 held retracted by a spring 58. The outer end of the armature is formed as a flat plate 59 bearing an upright pin 60 which extends upwardly between spaced ears 61 on the adjacent outer edge of the associated slide plate. There is only one set of spaced ears necessary for each pair of slide plates, due to the finger 55 and notch 54 connection therebetween.

The magnets 41 as shown in Fig. 6 may be mounted one above the other in any suitable manner from bracket plates such as 62 which are connected between the upper and lower frame plates 50 and 51. Whenever a magnet is pulsed, the armature is drawn in and the slide plates of a pair are moved from normal position. The circuitry involved in the pulsing of the magnets forms no part of this invention. When the magnet is deenergized the armature and the pair of slides are restored to normal position under the influence of the spring 58. In accordance with the code employed and which set of plates are used, one or more of the plates will be moved by the energization of one or more of the magnets to set the code slides so as to permit the oscillation of a selector bar 42 in the manner above described under the impulsion of their springs and control of the cam portions 43B of the flipper bails 44 as previously described.

When the device is set to operate for one code and it is desired to shift the mechanism to operate in another code, certain means is operated to move the operative set to inoperative position and to move the inoperative set to operative position. This means of course that one set of slide plates is advanced as the other is retracted. The means for achieving this movement is applied to opposite ends of the sets of slide plates and therefore the description of the moving mechanism at one end of the sets of plates will suffice for the description of both.

A shaft 63 (Fig. 6) is mounted at each end of the decoding unit between the upper and lower frame plates 50 and 51 and at its upper and lower ends acts as a pivot for pairs of scissor-like actuating plates 64 and 65. Each of these plates is provided with rods 66 and 67 which extend between the respective upper and lower plates 64 and 65. (Figs. 3 to 6.) The rods 66 pass through slots 68 in code slide plates 40 (Fig. 5) and the rods 67 pass through slots 69 in the code slide plates 39. As the scissor plates 64 and 65 are moved pivotally around the shaft 63 the rods 66 may be spread apart without interfering with the code slide plates 39 by reason of a cutout portion 70 in said plates 39 as shown clearly in Fig. 4. In Fig. 3 the code slide plates 39 are shown in their withdrawn or inoperative position and in Fig. 4 the same plates are shown moved to their advance or operative position. When the code slide plates 39 are in their operative position as shown in Fig. 4, the set of code slide plates 40 are disposed in their inoperative or withdrawn position as shown in Fig. 5. When the code slide plates 39 and 40 are moved endwise, by reason of the pulsing of the magnets 41 as above described, their movement in either direction is limited by the abutment of stop ears 71 and 72 (Fig. 2) formed thereon, with adjacent fixed surfaces on the unit.

In order to advance and retract the sets of code slide plates 39 and 40, a pusher frame 70A is provided comprising parallel vertical plates 73 and 74 (Fig. 6) connected at top and bottom by cross straps 75 and 76. On the inner face of the plates 73 and 74 are disposed rollers 77 and 78 respectively. Projecting vertically from each of the straps 75 and 76 are guide pins 79 and 80 for purposes later to be described. The plates 73 and 74 are provided with upper and lower rearwardly extending portions 81 and 82 in which are disposed horizontal slots 83 and 84 through which pass upper and lower rods 85 and 86 the ends of which are fixed to bracket members 87 and 88 connected in any suitable manner (not shown) to the main frame of the machine. These brackets also support suitable magnets, the armatures 89 only of which are shown. A connector element 90 extends from the armature 89 to the base 91 of a U-shaped pivoted rocker frame 95 the legs 92 and 93 of which form bell cranks with the upper free ends of the legs 92 of each rounded to form a nub 94 lying adjacent the rollers 77 and 78.

In Fig. 6 the parts are shown in the positions occupied when the armature 89 has been pulled up and the pusher frame has been advanced on the rods 85 and 86 by pressure of the rounded ends 94 of frame 95 against the rollers 77 and 78. When the magnets are deenergized a suitable spring means (not shown) restores the parts to the position in which the pusher frame 70A is drawn back from the position shown in Fig. 6. These magnets are pulsed by the current of a suitable circuit which it is not believed necessary to show and which may include switch means so that the shift of the sets of code slide plates may take place automatically, under the direction of a punched hole in a tape or card, or manually.

Referring back to the pins 79 and 80 at the upper and lower ends of the pusher frame 70A, they extend into slots 96 and 97 of the scissor plates 64 and 65. These slots are angularly disposed relatively to each other as shown in Fig. 4 in which the pins lie in the outer ends of the slots. In this position the rods 67 have been drawn together and the rods 66 have been moved apart thus moving the slides 39 to operative position and the slides 40 to inoperative position (Fig. 5). When the magnets are energized, the armatures 89, in the manner above described, move the pusher frame 70A to the position shown in Fig. 6 to shift the sets of code slide plates to the reverse relative positions.

While the structure of Fig. 8 is described in connection with the mechanism of Fig. 1, it can be used for verification purposes when incorporated in a machine of the character described in the application above referred to or in a tape or card circuit controlled typewriter. A stop bar means 96 in Fig. 8 underlying the center of the decoding arms may be employed to prevent depression of pulse conditioned decoding arms that do not coincide with the manual operation of the type keys by an operator. For instance, in copying from material that was being read from a tape in code for the purpose of verifying the data on the tape, should the typist press the "A" key and a "B" was read from the tape, the decoding arm 42 corresponding to "A" could not be pushed down by the "A" key lever and a mistake in the tape would be evident.

In the manner and by reason of the construction above described a simple and efficient mechanism is provided to shift one or another set of code slide plates into or out of operative position. One set of code slide plates may be notched to decode information on cards or tape in one code and the other set notched to decode information on cards or tape in another form of code. This shift is achieved quickly and easily either automatically or manually as above set forth. Thus the one machine may decode a plurality of codes.

While we have described what we consider to be a highly desirable embodiment of our invention, it is obvious that many changes in form can be made without departing from the spirit of the invention, and we, therefore, do not limit ourselves to the exact form herein shown and described, nor to anything less than the whole of our invention as hereinbefore set forth, and as hereinafter claimed.

What we claim is:

1. In a decoding device in which settable code plates are employed, the invention which comprises a series of pairs of code plates, each pair of plates disposed in the same plane with their code edges facing each other, and a second series of pairs of code plates similarly constructed and related to each other and respectively disposed between the pairs of code plates of the first series of code plates, and means connected to the pairs of each series of plates, which, when actuated, will move the pairs of each series from one position to another, the respective series of plates being settable in response to the receipt of information in different codes and having operative and inoperative positions.

2. The invention as set forth in claim 1, wherein one series of plates is in one position when the other series is in the other position.

3. In a decoding device in which settable code plates are employed, the invention which comprises a plurality of interposed sets of code plates respectively settable in response to the receipt of information in different codes, each of said sets of plates having an operative and an inoperative position, one set being in one position while the other set is in the other position, a pivoted scissor plate connected to one set of plates on one side of the pivot point and to the other sets of plates on the other side of the pivot point, and means connected to said scissor plate to oscillate it around its pivot point to move the sets of plates in opposite directions at right angles to their length.

4. In a decoding device in which settable code plates are employed, the invention which comprises a plurality of sets of interposed code plates respectively settable in response to the receipt of information in different codes, each set of said plates having an operative and an inoperative position, one set being in one position while the other set is in the other position, a pivoted element connected to one set of plates on one side of the pivot point and to the other set of plates on the other side of the pivot point, said pivoted element having a slot therein disposed at an angle to the longitudinal axes of said plates, actuating means, a pin on said actuating means extending into said slot, and means to move said actuating means to move the pin backward or forward in said slot whereby the pivoted element is oscillated to move the different sets of plates in respectively opposite directions at right angles to their lengths from one position to the other.

5. In a decoding device in which settable code plates are employed, the invention which comprises a plurality of sets of code plates arranged in interposed pairs, said sets being settable in response to the receipt of information in different codes, the plates of each pair being in planar relation and having operative and inoperative positions, the pairs of one set being in one position while the pairs of the other set are in the other position, the plates of each pair of plates having interengaging notches and fingers which remain in engagement whether the plates of the pair are in one position or the other, whereby said pair may be settable together along their longitudinal axes, a pair of scissor-like plates disposed on a common pivot point, said scissor-like plates having members thereon on one side of the pivot point and engaging the respective pairs of code plates of one set, and also having members thereon on the other side of the pivot point and engaging the respective pairs of code plates of the other set, and means for oscillating the scissor-like plates to move the pairs of code plates of one set apart and at the same time to move the pairs of code plates of the other set together.

6. The invention of claim 5 in which the scissor-like plates have slots therein which are obliquely disposed with respect to each other and to the length of said code plates and intercept each other, an actuating member, a pin on said actuating member extending into said slots, and means to move the actuating member and its pin backward and forward in the direction of the longitudinal axes of said code plates whereby the plates of one set are moved to operative position and the plates of the other set are moved to inoperative position.

7. The invention of claim 6 in which the actuating member is slidably mounted on a fixed portion of the device, a roller on said actuating member, a bell crank lever mounted on the device for rocking movement, one end of said bell crank lever being disposed adjacent said roller, means for holding the bell crank lever in a normal position, and means connected to said bell crank lever for rocking it against said roller to move the actuating means and oscilalte said scissor-like plates.

8. The combination with the key mechanism of a writing machine; of data decoding means including magnets for receiving impulses from a data circuit, groups of paired code plates serrated to provide a different code for each group and adjustable by said magnets for use in selected groups, laterally and downwardly movable decoding arms for lateral engagement with the serrations of said selected group of plates for controlling the operation of the key mechanism in accordance with the adjustment of said plates and stop means for arresting the downward movement of said decoding arms remaining out of engagement with said serrations.

9. The combination with the key mechanism of a writing machine; a data decoding means including magnets for receiving impulses from a data circuit, a plurality of groups of paired serrated code paired plates each group of said plates being separately adjustable by said magnets, decoding arms for engagement with the serrations of a selected group of said plates and movable to control operation of the key mechanism in accordance with the adjustment of one group of said plates and stop means for arresting the control movement of said decoding arms not engaging the serrations of said plates.

10. The combination with the printing key mechanism of a writing machine; of data decoding means including data circuit pulse means and groups of serrated code plates the plates of a selected group being adapted to be adjusted by the pulse means common to said selected group, decoding arms connected to the keys of said key mechanism and one of said arms being adapted to engage the serrations of said adjusted plates and be movable by manual operation of one of the keys of said key mechanism to activate the latter when the adjustment of said plates, by said pulse means, coincides with the character corresponding to said manually operated key and means for arresting operation of said arms when the adjustment of said plates by said pulse means does not coincide with the character corresponding to the manually operated key.

11. In a machine for recording data from code designations thereof including a data circuit; code means including different code groups of longitudinally movable slides arranged in superposed relation and each slide having an elongated median opening therein defining opposed edges serrated in code form; means included in said circuit for adjusting the slides of either of said groups to position serrations of the slides in accordance with code pulses received from said circuit; pendant arms extending through said openings and biased for lateral movement in opposite directions; means for moving the arms downwardly that, in lateral movement, have sensed positioned serrations; and printing key means operatively controlled by the downward movement of the arms for printing characters corresponding to said positioned serrations and stop means for arresting the downward movement of said pendant arms that have not sensed said positioned serrations.

12. In a machine for recording data from code designations thereof including a data circuit; code means including a plurality of sets of movable paired slides arranged in superposed relation and each pair of slides having an elongated median opening therein defining opposed edges serrated in code form; means included in said circuit for adjusting the paired slides of either set to position serrations thereof in accordance with selected code pulses received from said circuit; pairs of pendant arms extending through said openings, the arms of each pair being biased for lateral upper and lower case movement in opposite directions; means for moving the arms downwardly that, in lateral movement, have sensed positioned serrations; and means operated by the downward movement of the arms for printing characters and controlling machine operations in accordance with said sensed serrations and stop means for arresting the downward movement of said pendant arms that have not sensed said positioned serrations.

13. A data decoding means including magnets for receiving impulses from a data circuit, groups of code plates serrated to provide different codes, and one of said groups being divided into a plurality of pairs of plates providing codes in addition to those provided by said other group.

14. A data decoding means as set forth in claim 13, in which said groups of code plates are arranged in interspersed paired relation.

15. The combination with a writing machine including key levers, type bars operated by the key levers and mechanism for operating said key levers; of pivoted selector bars for controlling actuation of the key lever mechanism, means for moving said selector bars, a decoding unit comprising sets of code plates stacked in alternate pairs to represent different codes, the plates of each pair having an operative and an inoperative position and being disposed in planar relation and presenting spaced inner edges serrated in code form and between which edges said selector bars move to enter the vertically aligned notches of a selected set of code plates and be positioned for engagement by said selector bar moving means, and means for selectively positioning the pairs of plates of one set representing one code bar for engagement by said selector bars.

16. A device as set forth in claim 15 in which said means for moving the selector bars comprises oppositely extending shoulders on alternate selector bars and bail means for operatively engaging the shoulder of a selector bar that has moved into the aligned notches of the code plates of a selected set.

17. A device as set forth in claim 15 in which said selective set positioning means includes a pair of scissor plates having a common pivot point and pins thereon at opposite sides of said pivot point for engagement with the code plates of each set and means for oscillating said scissor plates to move the pairs of code plates of one set apart and at the same time to move the pairs of code plates of the other set together.

References Cited in the file of this patent

UNITED STATES PATENTS

| | | |
|---|---|---|
| 1,988,943 | Griffith | Jan. 22, 1935 |
| 2,174,596 | Potts | Oct. 3, 1939 |
| 2,559,637 | Kirchel | July 10, 1951 |
| 2,574,102 | Gubisch | Nov. 6, 1951 |
| 2,701,686 | Guttridge et al. | Feb. 8, 1955 |